United States Patent
Zhang et al.

(10) Patent No.: US 11,855,925 B2
(45) Date of Patent: Dec. 26, 2023

(54) UPLINK CONTROL INFORMATION SENDING AND RECEIVING METHOD AND APPARATUS

(71) Applicant: HUAWEI TECHNOLOGIES CO., LTD., Guangdong (CN)

(72) Inventors: Xingwei Zhang, Lund (SE); Jie Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 182 days.

(21) Appl. No.: 16/858,103

(22) Filed: Apr. 24, 2020

(65) Prior Publication Data

US 2020/0252185 A1 Aug. 6, 2020

Related U.S. Application Data

(63) Continuation of application No. PCT/CN2018/112210, filed on Oct. 26, 2018.

(30) Foreign Application Priority Data

Oct. 26, 2017 (CN) .......................... 201711022583.8

(51) Int. Cl.
*H04L 5/00* (2006.01)

(52) U.S. Cl.
CPC .......... *H04L 5/0053* (2013.01); *H04L 5/0005* (2013.01)

(58) Field of Classification Search
None
See application file for complete search history.

(56) References Cited

U.S. PATENT DOCUMENTS

| | | | |
|---|---|---|---|
| 2011/0171985 A1* | 7/2011 | Papasakellariou | H04W 72/0453 455/509 |
| 2012/0201212 A1 | 8/2012 | Xia et al. | |
| 2014/0192740 A1* | 7/2014 | Ekpenyong | H04L 5/0094 370/329 |
| 2014/0204811 A1* | 7/2014 | Lu | H04L 5/001 370/280 |
| 2014/0307643 A1* | 10/2014 | Froberg | H04L 5/0053 370/329 |
| 2015/0195832 A1 | 7/2015 | Cheng et al. | |

(Continued)

FOREIGN PATENT DOCUMENTS

| | | | | |
|---|---|---|---|---|
| CA | 3046451 A1 * | 6/2018 | | H04L 1/00 |
| CN | 101695017 A | 4/2010 | | |

(Continued)

OTHER PUBLICATIONS

Extended European Search Report issued in European Application No. 18870850.7 dated Nov. 23, 2020, 9 pages.

(Continued)

*Primary Examiner* — Alex Skripnikov
*Assistant Examiner* — Rodrick Mak
(74) *Attorney, Agent, or Firm* — Fish & Richardson P.C.

(57) ABSTRACT

This application provides an uplink control information sending method and apparatus and an uplink control information receiving method and apparatus. The sending method includes: determining a mapping-affecting factor, where the mapping-affecting factor is used to indicate a physical uplink shared channel (PUSCH) or uplink control information; mapping the uplink control information to the PUSCH based on the mapping-affecting factor; and sending the PUSCH to a base station.

17 Claims, 5 Drawing Sheets

(56) References Cited

U.S. PATENT DOCUMENTS

| | | | |
|---|---|---|---|
| 2016/0249355 A1* | 8/2016 | Chae | H04L 5/0091 |
| 2018/0092105 A1 | 3/2018 | Lee et al. | |
| 2018/0124749 A1* | 5/2018 | Park | H04L 27/0006 |
| 2018/0220413 A1* | 8/2018 | Yang | H04W 72/56 |
| 2019/0053218 A1* | 2/2019 | Kim | H04L 1/1812 |
| 2019/0104534 A1* | 4/2019 | Tsai | H04L 5/0057 |
| 2019/0109692 A1* | 4/2019 | Gao | H04L 1/18 |
| 2019/0116611 A1* | 4/2019 | Lee | H04W 72/20 |
| 2019/0199477 A1* | 6/2019 | Park | H04L 1/0693 |
| 2020/0045722 A1* | 2/2020 | Bae | H04L 5/0044 |
| 2020/0136746 A1* | 4/2020 | Li | H04L 1/0016 |
| 2021/0160864 A1* | 5/2021 | Lin | H04W 72/0446 |

FOREIGN PATENT DOCUMENTS

| | | | | |
|---|---|---|---|---|
| CN | 102315897 A | 1/2012 | | |
| CN | 102468917 A | 5/2012 | | |
| CN | 102771151 B | 3/2015 | | |
| CN | 106559878 A | 4/2017 | | |
| CN | 106992847 A | 7/2017 | | |
| CN | 105144618 B | 1/2019 | | |
| WO | 2014179964 A1 | 11/2014 | | |
| WO | 2016165118 A1 | 10/2016 | | |
| WO | 2016178439 A1 | 11/2016 | | |
| WO | WO-2018218519 A1 * | 12/2018 | | H04L 5/0053 |

OTHER PUBLICATIONS

Huawei, HiSilicon, "On transmission of UCI on PUSCH," 3GPP TSG RAN WG1 Meeting #89, R1-1706958, Hangzhou, China, May 15-19, 2017, 3 pages.

LG Electronics, "Considerations on UCI and UL channel multiplexing for NR," 3GPP TSG RAN WG1 Meeting 90bis, R1-1717962, Prague, CZ, Oct. 9-13, 2017, 14 pages.

NTT DOCOMO, Inc., "UCI multiplexing," 3GPP TSG RAN WG1 NR Ad-Hoc#3, R1-1716102, Nagoya, Japan, Sep. 18-21, 2017, 5 pages.

3GPP TS 38.213 V1.0.0 (Sep. 2017), "3rd Generation Partnership Project; Technical Specification Group Radio Access Network; NR; Physical layer procedures for control (Release 15)," Sep. 2017, 16 pages.

3GPP TS 38.331 V0.1.0 (Sep. 2017), "3rd Generation Partnership Project; Technical Specification Group Radio Access Network; NR; Radio Resource Control (RRC); Protocol specification (Release 15)," Sep. 2017, 154 pages.

PCT International Search Report and Written Opinion issued in International Application No. PCT/CN2018/112210 on Jan. 31, 2019, 18 pages (with English translation).

Ericsson, "Power Consumption Reduction for Paging and Connected-Mode DRX for NB-IoT," 3GPP TSG-RAN WG1 #89, R1-1706887, Hangzhou, China May 15-19, 2017, 5 pages.

Huawei et al., "Discussion on UCI Feedback for URLLC," 3GPP TSG RAN WG1 NR Ad Hoc Meeting, R1-1709989, Qingdao, China, Jun. 27-30, 2017, 4 pages.

Huawei et al., "Discussion on UCI Feedback for URLLC," 3GPP TSG RAN WG1 Meeting #90bis, R1-1717094, Prague, Czech Republic, Oct. 9-13, 2017, 5 pages.

Huawei et al., "UCI on sPUSCH," 3GPP TSG RAN WG1 Meeting #86, R1-166154, Gothenburg, Sweden, Aug. 22-26, 2016, 6 pages.

Office Action issued in Chinese Application No. 201711022583.8 dated Sep. 9, 2022, 12 pages.

* cited by examiner

UPLINK CONTROL INFORMATION SENDING AND RECEIVING METHOD AND APPARATUS

CROSS-REFERENCE TO RELATED APPLICATIONS

This application is a continuation of International Application No. PCT/CN2018/112210, filed on Oct. 26, 2018, which claims priority to Chinese Patent Application No. 201711022583.8, filed on Oct. 26, 2017. The disclosures of the aforementioned applications are hereby incorporated by reference in their entireties.

TECHNICAL FIELD

Embodiments of this application relate to the field of communications technologies, and in particular, to an uplink control information communication method and apparatus.

BACKGROUND

In a wireless communications system, a terminal usually transmits uplink control information (UCI) through a physical uplink control channel (PUCCH), and transmits data through a physical uplink shared channel (PUSCH). When a base station configures the terminal to disable a function of simultaneously transmitting a PUCCH and a PUSCH, or the terminal does not have a function of simultaneously transmitting a PUCCH and a PUSCH at a moment, the terminal transmits only the PUSCH at the moment, and UCI in the PUCCH is embedded into the PUSCH to be transmitted together with data.

In a long term evolution-advanced (LTE-A) system, transmission duration of a PUCCH is fixed to 1 ms, and a subcarrier spacing in frequency domain is also a fixed value. Therefore, when a terminal multiplexes UCI in the PUCCH to a PUSCH to transmit the UCI with data, rate matching is performed on data around the UCI, or data is punctured with the UCI. Specifically, a channel quality indicator (CQI), a precoding matrix indicator (PMI), and a precoding type indicator (PTI) in the UCI are horizontally arranged from a high frequency part, an acknowledgement/negative acknowledgement (A/N) is attached to symbols on two sides of a demodulation reference signal (DMRS), and a rank indicator (RI) is arranged outside the A/N.

However, in new radio (NR), transmission duration of a PUCCH is not fixed, and there are a plurality of subcarrier spacings in NR. Consequently, there are a plurality of unit symbol lengths. Therefore, how to map UCI to a PUSCH to ensure that the uplink control information can be properly sent through the PUSCH is a technical problem to be urgently resolved currently.

SUMMARY

Embodiments of this application provide an uplink control information communication method and apparatus, to properly map uplink control information to a PUSCH and properly send the UCI through the PUSCH.

A first aspect of this application provides an uplink control information communication method, including: determining a mapping-affecting factor, where the mapping-affecting factor is used to indicate a physical uplink shared channel (PUSCH) or uplink control information; mapping the uplink control information to the PUSCH based on the mapping-affecting factor; and sending the PUSCH to a base station.

In this solution, the UCI includes a plurality of pieces of information such as a channel state indicator (CSI), an acknowledgement/negative acknowledgment (A/N), a scheduling request (SR), and some beam-related indication information. The CSI further includes a channel quality indicator (CQI), a precoding matrix indicator (PMI), a precoding type indicator (PTI), a rank indicator (RI), and the like.

In the foregoing solution, after determining the mapping-affecting factor, a terminal device maps the uplink control information to the PUSCH in different manners based on different mapping-affecting factors. Therefore, the terminal can properly map the uplink control information (UCI) to the PUSCH, and can properly send the UCI through the PUSCH.

Optionally, the mapping-affecting factor includes at least one of the following information: a subcarrier spacing of a resource configured for the uplink control information, a subcarrier spacing of the PUSCH, a time domain position of the resource configured for the uplink control information, a time domain position of the PUSCH, a frequency domain position of the resource configured for the uplink control information, a frequency domain position of the PUSCH, a transmission latency of the uplink control information, a processing latency of a terminal, information about a code block group (CBG) of the PUSCH, a frequency hopping status of the PUSCH, a modulation order of the PUSCH, a code rate of the PUSCH, retransmission information of data in the PUSCH, a size of a data packet in the PUSCH, whether the PUSCH and the resource configured for the uplink control information are located on a same carrier or a same bandwidth part, a position of a reference signal of the PUSCH, or a timing of the uplink control information.

Optionally, the mapping-affecting factor includes the subcarrier spacing of the resource configured for the uplink control information and the subcarrier spacing of the PUSCH, and the uplink control information is mapped to a time domain resource, of the PUSCH, corresponding to a time domain resource that can cover the uplink control information.

In this solution, when the subcarrier spacing of the resource configured for the UCI is different from the subcarrier spacing of the PUSCH, for example, the PUSCH and the resource configured for the UCI are located on different carriers (one carrier cannot provide UE with a plurality of activated bandwidth parts with different subcarrier spacings), a length of a symbol of the resource configured for the UCI is different from that of a symbol of the PUSCH. In this case, when the UCI is mapped, the UCI may be mapped to the time domain resource, of the PUSCH, corresponding to the time domain resource that can cover the UCI, to ensure that the UCI can be properly mapped to the PUSCH, thereby ensuring normal transmission of the UCI.

Optionally, the mapping-affecting factor includes the time domain position of the resource configured for the uplink control information and the time domain position of the PUSCH, and the uplink control information is mapped to an overlapping time domain resource between the PUSCH and the resource configured for the uplink control information.

The resource configured for the UCI may completely or partially overlap the PUSCH. When the resource configured for the UCI partially overlaps and is earlier than the PUSCH, the UCI may be mapped to an earliest symbol in the PUSCH. In this way, the transmission latency of the UCI can be reduced as much as possible. When the resource configured for the UCI partially overlaps and is later than the PUSCH, the UCI may be mapped to a latest symbol in the PUSCH. In this way, it is ensured that the UCI can be mapped to the PUSCH.

Optionally, the uplink control information is mapped to the first overlapping symbol between the PUSCH and the resource configured for the uplink control information or the uplink control information is mapped to a symbol configured by the base station.

In this solution, when there is an overlapping time domain resource between the PUSCH and the resource configured for the UCI, the UCI may be mapped to the first overlapping symbol. In this way, the transmission latency of the UCI is lower.

Optionally, a symbol corresponding to a position, in the PUSCH, to which the uplink control information is mapped is not earlier than a start symbol of the resource configured for the uplink control information, or is not later than the last symbol of the resource configured for the uplink control information.

In this solution, the time domain position of the resource configured for the UCI includes the start symbol, an end symbol, and a quantity of symbols of the resource, and the time domain position of the PUSCH includes a start symbol, an end symbol, and a quantity of symbols of the PUSCH.

Optionally, the mapping-affecting factor includes the frequency domain position of the resource configured for the uplink control information and the frequency domain position of the PUSCH, and the uplink control information is mapped to an overlapping frequency domain resource between the PUSCH and the resource configured for the uplink control information.

In this solution, both the frequency domain position of the resource configured for the UCI and the frequency domain position of the PUSCH include a start resource block (RB), an end RB, and a quantity of RBs. The terminal may determine, based on the start RB, the end RB, and the quantity of RBs of the resource configured for the UCI, and the start RB, the end RB, and the quantity of RBs of the PUSCH, the overlapping frequency domain resource between the PUSCH and the resource configured for the UCI, and map the UCI to the overlapping frequency domain resource.

Optionally, the mapping-affecting factor includes the transmission latency of the uplink control information, and a time domain position to which the uplink control information is mapped satisfies the transmission latency of the uplink control information.

In this solution, the UCI includes the plurality of pieces of information such as the CSI, the A/N, and the SR. Although all the information is multiplexed in a same resource, the information has respective transmission latencies, in other words, has respective timings. When the terminal maps the UCI, the time domain position, in the PUSCH, to which the UCI is mapped is not later than a smallest value of the transmission latencies respectively corresponding to the CSI, the A/N, and the SR. In this way, a sending latency of the mapped UCI can be ensured.

Optionally, the mapping-affecting factor includes the processing latency of the terminal, and a time domain position to which the uplink control information is mapped is greater than the processing latency of the terminal.

In this solution, the time domain position to which the UCI is mapped is greater than the processing latency of the terminal. In this way, the UE can have enough time to process the UCI, thereby ensuring normal sending of the UCI.

Optionally, the mapping-affecting factor includes the information about the code block group (CBG) of the PUSCH, and the uplink control information is mapped to a CBG, in the PUSCH, that is located within a time domain resource range configured for the uplink control information.

In this solution, the UCI is mapped to the CBG, in the PUSCH, that is located within the time domain resource range configured for the UCI, so that a quantity of CBGs that need to be retransmitted can be reduced.

Optionally, the mapping-affecting factor includes the frequency hopping status of the PUSCH, and the uplink control information is mapped to each hop in the PUSCH in a distributed manner, or the uplink control information is mapped to one hop in the PUSCH in a localized manner.

In this solution, if the data in the PUSCH has frequency-domain hops, the UCI may be mapped to each hop in the PUSCH in a distributed manner, so that a frequency diversity gain can be obtained. In addition, the UCI may alternatively be mapped to a few hops in the PUSCH in a localized manner, for example, may be mapped to one hop in a localized manner, to reduce complexity of UCI demodulation.

Optionally, the mapping-affecting factor includes whether the PUSCH and the resource configured for the uplink control information are located on a same carrier or a same bandwidth part; and if the PUSCH and the resource configured for the uplink control information are located on a same carrier or a same bandwidth part, the uplink control information is mapped to the PUSCH in a frequency domain first manner; or if the PUSCH and the resource configured for the uplink control information are not located on a same carrier or a same bandwidth part, the uplink control information is mapped to the PUSCH in a time domain first manner.

In this solution, if the PUSCH and the resource configured for the UCI are located on a same carrier or a same BWP, there is a relatively high possibility that the PUSCH and the resource configured for the UCI have a same subcarrier spacing (SCS). In this case, the UCI may be mapped to the PUSCH in the frequency domain first manner. If the PUSCH and the resource configured for the UCI are not located on a same carrier or a same BWP, there is a relatively high possibility that the PUSCH and the resource configured for the UCI have different SCSs. In this case, the UCI may be mapped to the PUSCH in the time domain first manner.

Optionally, if the PUSCH includes the reference signal, the uplink control information is mapped to a position, in the PUSCH, that does not overlap with the reference signal; or when a quantity of bits of the uplink control information is less than a preset threshold, the uplink control information is mapped to the reference signal in the PUSCH, where the reference signal includes at least one of the following signals: a demodulation reference signal DMRS, a sounding reference signal SRS, a channel state information-reference signal CSI-RS, or a phase tracking reference signal PT-RS.

In this solution, when the UCI is mapped, if the PUSCH includes at least one of the DMRS, the SRS, the CSI-RS, or the PT-RS, a position of the DMRS, the SRS, the CSI-RS, or the PT-RS may be avoided, to be specific, the UCI is mapped to the position, in the PUSCH, that does not overlap with the reference signal. In addition, if the quantity of bits of the UCI is relatively small, for example, less than 2, the UCI may be directly mapped to the reference signal in the PUSCH. For example, a cyclic shift (CS), an orthogonal cover code (OCC), or a comb carries a bit.

Optionally, the uplink control information includes at least two parts, and the at least two parts are mapped to the PUSCH in different mapping manners, or the at least two parts are mapped to different time-frequency resources.

In this solution, the UCI may be divided into a plurality of parts. When each part is mapped to the PUSCH, a corresponding mapping manner and a time-frequency resource to which the part is mapped may be independently selected.

Optionally, types of information included in the parts are different.

In this solution, the UCI includes the information such as the CSI, the A/N, and the SR. If the UCI includes at least two parts of information, types of the information included in the parts are different.

Optionally, a mapping manner of the uplink control information is localized mapping or distributed mapping; or a mapping manner of the uplink control information is puncturing data with the uplink control information or performing rate matching on data around the uplink control information.

In this solution, when the UCI is mapped to the PUSCH, the manner of localized mapping or the manner of distributed mapping may be performed by puncturing data with the UCI or by performing rate matching on data around the UCI.

Optionally, the mapping-affecting factor is configured by the base station for the terminal or is reported by the terminal to the base station.

In this solution, the subcarrier spacing of the resource configured for the UCI, the subcarrier spacing of the PUSCH, the time domain position of the resource configured for the UCI, the time domain position of the PUSCH, the frequency domain position of the resource configured for the UCI, the frequency domain position of the PUSCH, the transmission latency of the UCI, the information about the CBG of the PUSCH, the frequency hopping status of the PUSCH, the modulation order of the PUSCH, the code rate of the PUSCH, the retransmission information of the data in the PUSCH, the size of the data packet in the PUSCH, whether the PUSCH and the resource configured for the UCI are located on a same carrier or a same bandwidth part, the position of the reference signal of the PUSCH, or the timing of the UCI is configured by the base station for the terminal, and the processing latency of the terminal is reported by the terminal to the base station.

A second aspect of this application provides an uplink control information communication method, including: receiving a physical uplink shared channel (PUSCH) sent by a terminal, where the PUSCH includes uplink control information; and obtaining, based on a mapping-affecting factor, the uplink control information included in the PUSCH, where the mapping-affecting factor is used to indicate the physical uplink shared channel (PUSCH) or the uplink control information.

In this solution, the UCI includes a plurality of pieces of information such as a CSI, an A/N, an SR, and some beam-related indication information. The CSI further includes a CQI, a PMI, a PTI, an RI, and the like.

In the foregoing solution, after receiving the PUSCH, a base station may obtain the UCI from the PUSCH based on the mapping-affecting factor, thereby ensuring normal transmission of the UCI.

Optionally, the mapping-affecting factor includes at least one of the following information: a subcarrier spacing of a resource configured for the uplink control information, a subcarrier spacing of the PUSCH, a time domain position of the resource configured for the uplink control information, a time domain position of the PUSCH, a frequency domain position of the resource configured for the uplink control information, a frequency domain position of the PUSCH, a transmission latency of the uplink control information, a processing latency of the terminal, information about a code block group (CBG) of the PUSCH, a frequency hopping status of the PUSCH, a modulation order of the PUSCH, a code rate of the PUSCH, retransmission information of data in the PUSCH, a size of a data packet in the PUSCH, whether the PUSCH and the resource configured for the uplink control information are located on a same carrier or a same bandwidth part, a position of a reference signal of the PUSCH, or a timing of the uplink control information.

Optionally, the mapping-affecting factor is configured by a base station for the terminal or is reported by the terminal to the base station.

In this solution, the subcarrier spacing of the resource configured for the UCI, the subcarrier spacing of the PUSCH, the time domain position of the resource configured for the UCI, the time domain position of the PUSCH, the frequency domain position of the resource configured for the UCI, the frequency domain position of the PUSCH, the transmission latency of the UCI, the information about the CBG of the PUSCH, the frequency hopping status of the PUSCH, the modulation order of the PUSCH, the code rate of the PUSCH, the retransmission information of the data in the PUSCH, the size of the data packet in the PUSCH, whether the PUSCH and the resource configured for the UCI are located on a same carrier or a same bandwidth part, the position of the reference signal of the PUSCH, or the timing of the UCI is configured by the base station for the terminal, and the processing latency of the terminal is reported by the terminal to the base station.

A third aspect of the embodiments of this application provides an uplink control information transmission apparatus. The apparatus may be a communications device, or may be a chip in a communications device. The communications device or the chip has a function of implementing the uplink control information communication method according to any one of the first aspect or the possible designs of the first aspect. The function may be implemented by hardware, or may be implemented by hardware by executing corresponding software. The hardware or the software includes one or more units corresponding to the foregoing functions.

The communications device includes a processing unit and a transceiver unit. The processing unit may be a processor, the transceiver unit may be a transceiver, and the transceiver includes a radio frequency circuit. Optionally, the communications device further includes a storage unit, and the storage unit may be, for example, a memory. When the communications device includes the storage unit, the storage unit is configured to store a computer-executable instruction, the processing unit is connected to the storage unit, and the processing unit executes the computer-executable instruction stored in the storage unit, to enable the communications device to perform the uplink control information communication method according to any one of the first aspect or the possible designs of the first aspect.

The chip includes a processing unit and a transceiver unit. The processing unit may be a processor, and the transceiver unit may be an input/output interface, a pin, a circuit, or the like on the chip. The processing unit may execute a computer-executable instruction stored in a storage unit, to enable the chip to perform the uplink control information communication method according to any one of the first aspect or the possible designs of the first aspect. Optionally, the storage unit may be a storage unit (for example, a register or a buffer) in the chip, or the storage unit may be a storage unit (for example, a read-only memory (ROM)) that is in the communications device and that is located outside the chip, another type of static storage device (for example, a random access memory (RAM)) that can store static information and a static instruction, or the like.

The processor in the third aspect may be a central processing unit (CPU), a microprocessor, or an application-specific integrated circuit (ASIC), or may be one or more integrated circuits configured to control execution of a program of the uplink control information communication method according to any one of the first aspect or the possible designs of the first aspect.

A fourth aspect of the embodiments of this application provides a signal processing apparatus. The signal processing apparatus may be a communications device, or may be a chip in a communications device. The communications device or the chip has a function of implementing the uplink control information communication method according to any one of the second aspect or the possible designs of the second aspect. The function may be implemented by hardware, or may be implemented by hardware by executing corresponding software. The hardware or the software includes one or more units corresponding to the foregoing functions.

The communications device includes a processing unit and a transceiver unit. The processing unit may be a processor, the transceiver unit may be a transceiver, and the transceiver includes a radio frequency circuit. Optionally, the communications device further includes a storage unit, and the storage unit may be, for example, a memory. When the communications device includes the storage unit, the storage unit is configured to store a computer-executable instruction, the processing unit is connected to the storage unit, and the processing unit executes the computer-executable instruction stored in the storage unit, to enable the communications device to perform the uplink control information communication method according to any one of the second aspect or the possible designs of the second aspect.

The chip includes a processing unit and a transceiver unit. The processing unit may be a processor, and the transceiver unit may be an input/output interface, a pin, a circuit, or the like on the chip. The processing unit may execute a computer-executable instruction stored in a storage unit, to enable the chip to perform the uplink control information communication method according to any one of the second aspect or the possible designs of the second aspect. Optionally, the storage unit may be a storage unit (for example, a register or a buffer) in the chip, or the storage unit may be a storage unit (for example, a read-only memory (ROM)) that is in the communications device and that is located outside the chip, another type of static storage device (for example, a random access memory (RAM)) that can store static information and a static instruction, or the like.

The processor in the fourth aspect may be a central processing unit (CPU), a microprocessor, or an application-specific integrated circuit (ASIC), or may be one or more integrated circuits configured to control execution of a program of the uplink control information communication method according to any one of the second aspect or the possible designs of the second aspect.

A fifth aspect of the embodiments of this application provides a communications system. The communications system includes the communications device provided in the third aspect of the embodiments of this application and the communications device provided in the fourth aspect of the embodiments of this application.

A sixth aspect of the embodiments of this application provides a computer-readable storage medium, configured to store a computer instruction. When the computer instruction is run on a computer, the computer is enabled to perform the uplink control information communication method according to the first aspect or the second aspect of the embodiments of this application.

A seventh aspect of the embodiments of this application provides a computer program product including an instruction. When the computer program product is run on a computer, the computer is enabled to perform the uplink control information communication method according to the first aspect or the second aspect of the embodiments of this application.

According to the uplink control information mapping method and apparatus provided in this application, the mapping-affecting factor is determined, the uplink control information is mapped to the PUSCH based on the mapping-affecting factor, and then the PUSCH is sent to the base station. The mapping-affecting factor is used to indicate the PUSCH or the uplink control information. After determining the mapping-affecting factor, the terminal device maps the uplink control information to the PUSCH in different manners based on different mapping-affecting factors. Therefore, the terminal can properly map the uplink control information (UCI) to the PUSCH, and can properly send the UCI through the PUSCH.

DESCRIPTION OF EMBODIMENTS

Some terms in this application are explained and described below, to help a person skilled in the art have a better understanding.

(1) A terminal is also referred to as user equipment (UE), a mobile station (MS), a mobile terminal (MT), or the like, and is a device that provides a user with voice and/or data connectivity, for example, a handheld device or a vehicle-mounted device that has a wireless connection function. Currently, the terminal may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

(2) A base station (for example, an access point) may refer to a device communicating with a wireless terminal over an air interface by using one or more sectors in an access network. The base station may be configured to mutually convert a received over-the-air frame and an IP packet, and serve as a router between a wireless terminal and a remaining part of the access network. The remaining part of the access network may include an internet protocol (IP) network. The base station may further coordinate attribute management of an air interface. For example, the base station may be a base transceiver station (BTS) in GSM or CDMA, a NodeB in WCDMA, or an evolved NodeB (eNB, or e-NodeB) in long term evolution (LTE). This is not limited in this application.

Figure 1:
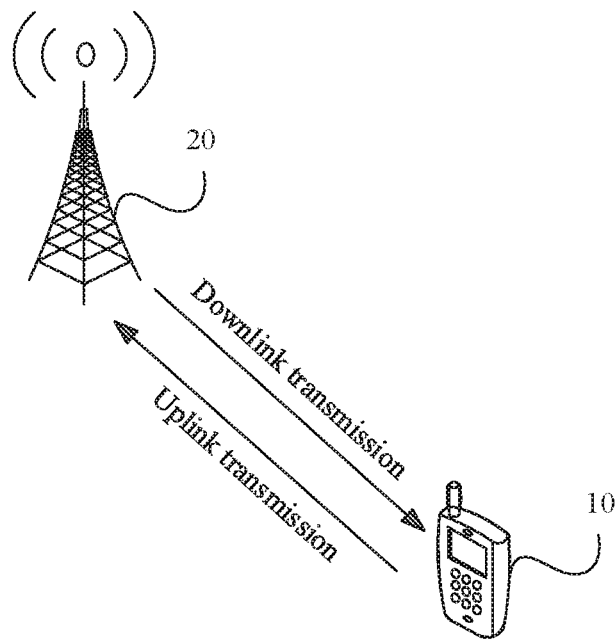
FIG. 1 is a schematic architectural diagram of an NR system.

A person skilled in the art may understand that an uplink control information mapping method provided in the embodiments of this application may be applied to a 5th generation (5G) network and a next generation communications system. FIG. 1 is a schematic architectural diagram of an NR system. As shown in FIG. 1, the system includes a terminal 10 and a base station 20. The terminal 10 may be, for example, UE. A process in which the base station 20 sends data to the terminal 10 is downlink transmission, and a process in which the terminal 10 sends data to the base station 20 is uplink transmission.

Based on the system architecture shown in FIG. 1, a plurality of subcarrier spacings are introduced in 5G NR. A baseline is 15 kHz, and the subcarrier spacing may be represented as 15 kHz*$2^n$, where n is an integer. In this way, there are eight subcarrier spacings at most: 3.75 kHz, 7.5 kHz, . . . and 480 kHz. Correspondingly, there are a plurality of symbol lengths and slot lengths. A length of a subframe is fixed to one millisecond. Therefore, a quantity of slots included in one subframe varies with a subcarrier spacing. In addition, in NR, one slot may include at least one of downlink transmission, a guard period (GP), uplink transmission, and the like. In this case, composition of the slot includes at least the following several types: a downlink (DL) only slot a downlink centric slot, an uplink (UL) centric slot, an uplink only slot, and the like. Different composition of the slot may include different quantities of uplink symbols, different quantities of downlink symbols, or different quantities of guard period symbols.

In addition, there may be different slot types, and different slot types include different quantities of symbols. For example, a mini slot includes symbols whose quantity is less than 14 (for example, one symbol, two symbols, four symbols, or seven symbols), and a common slot includes 14 symbols. When the NR system operates in a high frequency scenario, fading is relatively severe. To resolve a coverage problem, a slot aggregation technology is introduced in NR. To be specific, a plurality of slots may be allocated to same UE for data transmission, and may be used for uplink data (a PUSCH) scheduling or downlink data (a PDSCH) scheduling. The plurality of slots may further be used for UCI (PUCCH) repetition.

In NR uplink transmission, when both UCI and data need to be transmitted in a slot, the UCI is carried in a PUSCH to be transmitted together with the data. Transmission duration of a PUCCH is not fixed, and there are a plurality of subcarrier spacings in NR. Consequently, there are a plurality of unit symbol lengths. Therefore, a terminal cannot properly map the UCI to the PUSCH, and cannot properly send the uplink control information through the PUSCH.

In consideration of these cases, the embodiments of this application provides the uplink control information mapping method. A mapping-affecting factor is determined, uplink control information is mapped to a PUSCH based on the mapping-affecting factor, and then the PUSCH is sent to a base station. The mapping-affecting factor is used to indicate the PUSCH or the uplink control information. After determining the mapping-affecting factor, a terminal device maps the uplink control information to the PUSCH in different manners based on different mapping-affecting factors. Therefore, the terminal can properly map the uplink control information (UCI) to the PUSCH, and can properly send the UCI through the PUSCH.

Figure 2:
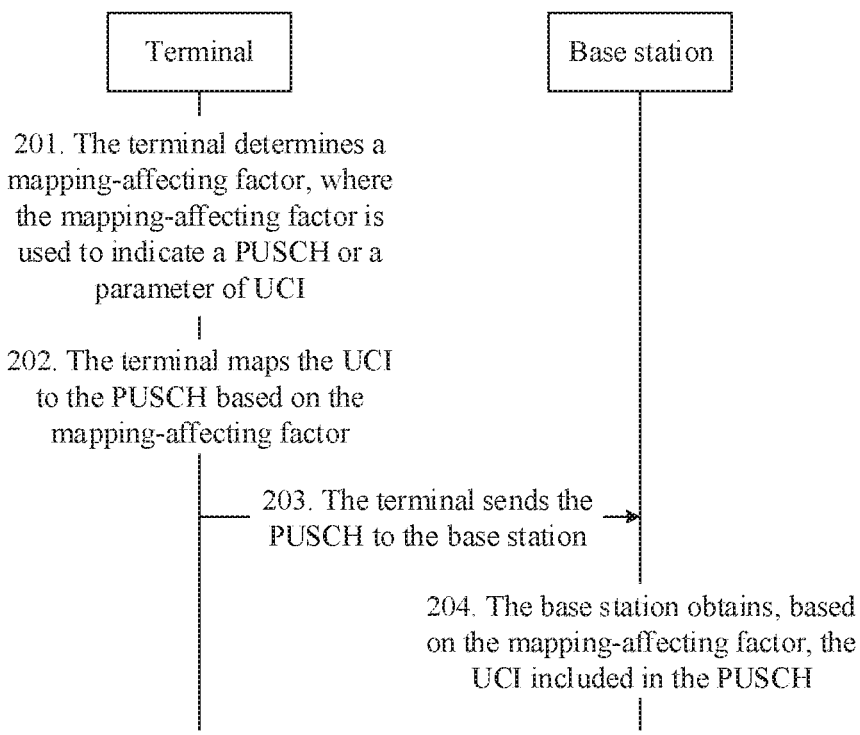
FIG. 2 is a signaling flowchart of Embodiment 1 of an uplink control information mapping method according to this application.

FIG. 2 is a signaling flowchart of Embodiment 1 of an uplink control information mapping method according to this application. Based on the system architecture shown in FIG. 1, as shown in FIG. 2, the method in this embodiment may include the following steps.

Step 201. The terminal determines a mapping-affecting factor, where the mapping-affecting factor is used to indicate a PUSCH or UCI.

In this embodiment, when the base station configures the terminal to disable a function of simultaneously transmitting a PUCCH and a PUSCH, or the terminal does not have a function of simultaneously transmitting a PUCCH and a PUSCH at a moment, the terminal transmits only the PUSCH at the moment, and UCI in the PUCCH is embedded into the PUSCH to be transmitted together with data. In NR, transmission duration of the PUCCH is not fixed, and there are a plurality of subcarrier spacings in NR. Consequently, there are a plurality of unit symbol lengths. Therefore, when the UCI is mapped to the PUSCH, there are a plurality of mapping-affecting factors that affect a mapping position of the UCI. The mapping-affecting factor is used to indicate the PUSCH or the UCI.

Specifically, the UCI includes a plurality of pieces of information such as a channel state indicator (CSI), an acknowledgement/negative acknowledgment (A/N), a scheduling request (SR), and some beam-related indication information. The CSI further includes a channel quality indicator (CQI), a precoding matrix indicator (PMI), a precoding type indicator (PTI), a rank indicator (RI), and the like.

In a possible implementation, the mapping-affecting factor includes at least one of the following information: a subcarrier spacing of a resource configured for the UCI, a subcarrier spacing of the PUSCH, a time domain position of the resource configured for the UCI, a time domain position of the PUSCH, a frequency domain position of the resource configured for the UCI, a frequency domain position of the PUSCH, a transmission latency of the UCI, a processing latency of the terminal, code block group (CBG) information of the PUSCH, a frequency hopping status of the PUSCH, a modulation order of the PUSCH, a code rate of the PUSCH, retransmission information of data in the PUSCH, a size of a data packet in the PUSCH, whether the PUSCH and the resource configured for the uplink control information are located on a same carrier or a same bandwidth part (BWP), a position of a reference signal of the PUSCH, or a timing of the uplink control information.

The resource configured for the UCI is a PUCCH resource configured by the base station for the terminal to send the UCI, may be a short PUCCH that occupies only one or two symbols or a long PUCCH that occupies four to 14 symbols, or may be a PUCCH occupying one RB or a PUCCH occupying a plurality of RBs. However, uplink data (the PUSCH) is simultaneously scheduled at this moment, and the terminal does not have the function of simultaneously transmitting a PUCCH and a PUSCH at a moment; or the terminal has the function of simultaneously transmitting a PUCCH and a PUSCH at a moment, but the base station configures the terminal to disable the function of simultaneously transmitting a PUCCH and a PUSCH. Therefore, the terminal actually does not send the PUCCH.

In a possible implementation, the mapping-affecting factor is configured by the base station for the terminal or is reported by the terminal to the base station. The subcarrier spacing of the resource configured for the UCI, the subcarrier spacing of the PUSCH, the time domain position of the resource configured for the UCI, the time domain position of the PUSCH, the frequency domain position of the resource configured for the UCI, the frequency domain position of the PUSCH, the transmission latency of the UCI, the information about the CBG of the PUSCH, the frequency hopping status of the PUSCH, the modulation order of the PUSCH, the code rate of the PUSCH, the retransmission information of the data in the PUSCH, the size of the data packet in the PUSCH, whether the PUSCH and the resource configured for the UCI are located on a same carrier or a same bandwidth part, the position of the reference signal of the PUSCH, or the timing of the UCI is configured by the base station for the terminal, and the processing latency of the terminal is reported by the terminal to the base station.

Step 202. The terminal maps the UCI to the PUSCH based on the mapping-affecting factor.

In this embodiment, after determining the mapping-affecting factor, the terminal may determine different mapping manners based on different mapping-affecting factors, and map the UCI to the PUSCH in the different mapping manners.

In this embodiment, after determining the mapping-affecting factor, the terminal may determine different mapping resources based on different mapping-affecting factors, and map the UCI to a corresponding mapping resource of the PUSCH.

The following describes in detail a specific manner in which the terminal maps the UCI to the PUSCH based on different mapping-affecting factors.

Optionally, if the mapping-affecting factor includes the subcarrier spacing of the resource configured for the UCI and the subcarrier spacing of the PUSCH, the UCI is mapped to a time domain resource, of the PUSCH, corresponding to a time domain resource that can cover the UCI.

Specifically, before the UCI is sent, the base station configures, for the terminal, a resource carrying the UCI, for example, may configure a PUCCH resource. However, the PUCCH and the PUSCH exactly appear in a same slot, and the UE is incapable of simultaneously transmitting a PUCCH and a PUSCH, or the base station does not allow simultaneous transmission of a PUCCH and a PUSCH. For the terminal, the terminal can learn of the resource carrying the UCI.

When the subcarrier spacing of the resource configured for the UCI is different from the subcarrier spacing of the PUSCH, for example, the PUSCH and the resource configured for the UCI are located on different carriers (one carrier cannot provide UE with a plurality of activated bandwidth parts BWPs with different subcarrier spacings), a length of a symbol of the resource configured for the UCI is different from that of a symbol of the PUSCH. In this case, when the UCI is mapped, the UCI may be mapped to the time domain resource, of the PUSCH, corresponding to the time domain resource that can cover the UCI.

Figure 3A:
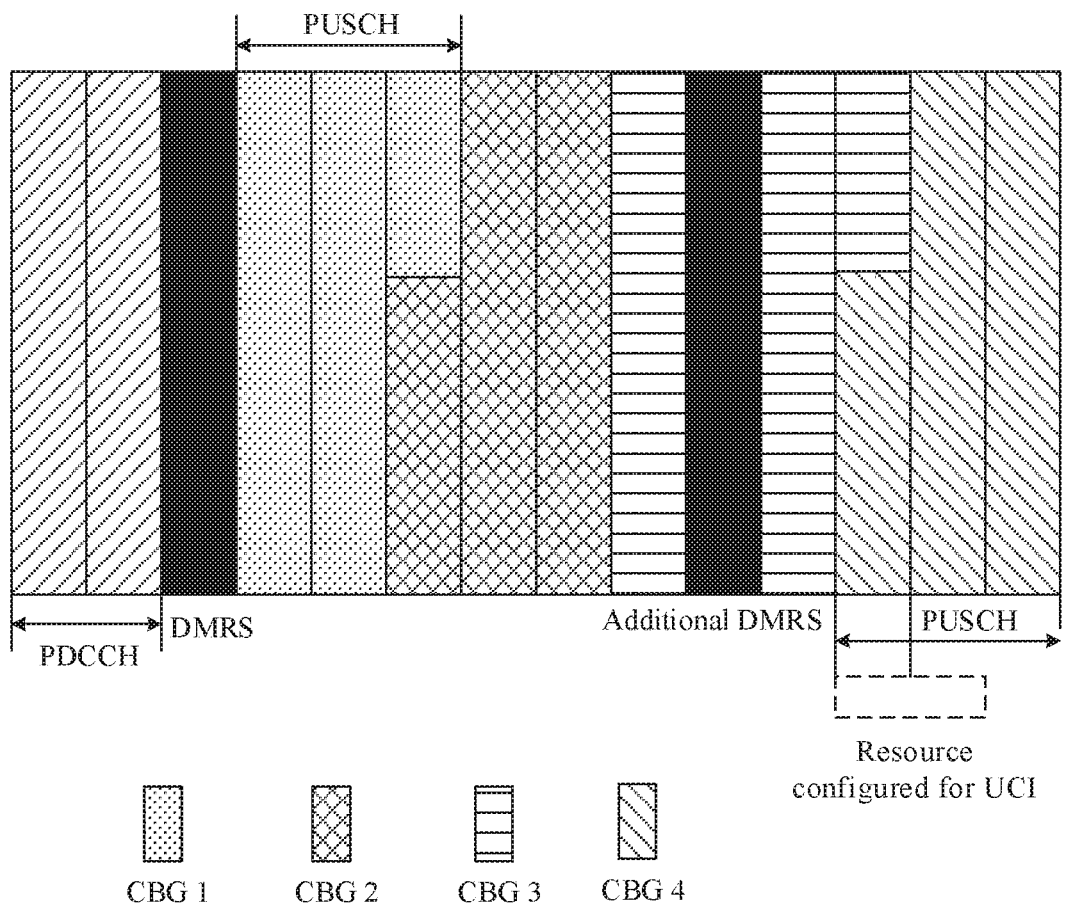
FIG. 3a is a schematic diagram of a subcarrier spacing of a resource configured for UCI and a subcarrier spacing of a PUSCH.

For example, FIG. 3a is a schematic diagram of a subcarrier spacing of a resource configured for UCI and a subcarrier spacing of a PUSCH. As shown in FIG. 3a, assume that the subcarrier spacing of the resource configured for the UCI is less than the subcarrier spacing of the PUSCH, in other words, a symbol of the resource configured for the UCI is greater than a symbol of the PUSCH. Using 15 kHz and 30 kHz as an example, a symbol length of a carrier on which the resource configured for the UCI is located is twice a symbol length of a carrier on which the PUSCH is located. When the UCI is mapped, the UCI may be mapped to a time domain resource, of the PUSCH, corresponding to a time domain resource that can cover the UCI, to be specific, the UCI is mapped to symbols, of the PUSCH, corresponding to a symbol on which the resource configured for the UCI is located. As shown in FIG. 3a, the UCI may be mapped to two PUSCHs, for example, the twelfth symbol and the thirteenth symbol, that overlap the symbol of the resource configured for the UCI. In addition, bandwidth of the resource configured for the UCI is usually narrower than that of the PUSCH. Therefore, the UCI may need to be mapped only to one symbol in the PUSCH. In this case, a part of the two PUSCH symbols that overlap the PUCCH symbol may be selected to map the UCI. In a possible implementation, the former symbol such as the twelfth symbol may be selected. In this way, the transmission latency of the UCI is lower. Certainly, the base station may alternatively determine a symbol in overlapping symbols that is used to carry the UCI, and then notify the terminal of a determined result, and the terminal maps the UCI to the symbol determined by the base station.

Figure 3B:
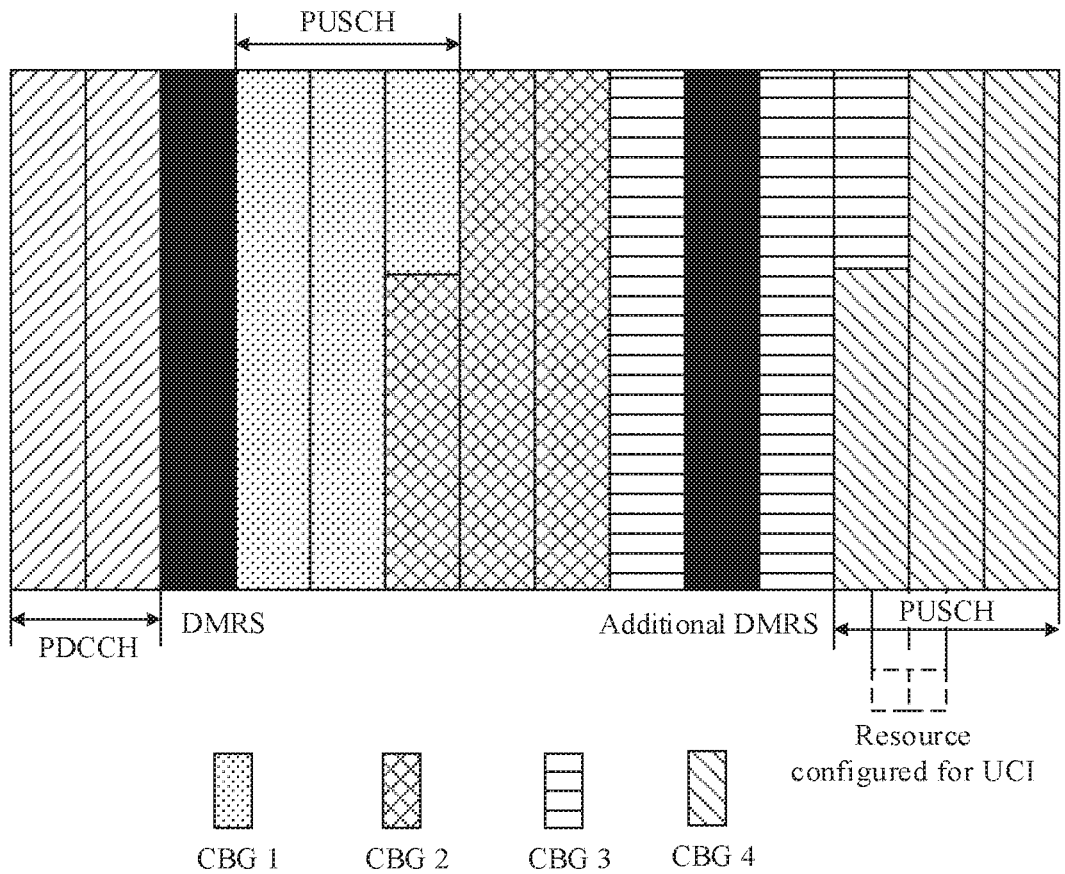
FIG. 3b is another schematic diagram of a subcarrier spacing of a resource configured for UCI and a subcarrier spacing of a PUSCH.

FIG. 3b is another schematic diagram of a subcarrier spacing of a resource configured for UCI and a subcarrier spacing of a PUSCH. As shown in FIG. 3b, assume that the subcarrier spacing of the resource configured for the UCI is greater than the subcarrier spacing of the PUSCH, in other words, a symbol of the resource configured for the UCI is less than a symbol of the PUSCH. Using 30 kHz and 15 kHz as an example, a symbol length of a carrier on which the resource configured for the UCI is located is half of a symbol length of a carrier on which the PUSCH is located. When the UCI is mapped, the UCI may be mapped to a time domain resource, of the PUSCH, corresponding to a time domain resource that can cover the UCI, to be specific, the UCI is mapped to a symbol, of the PUSCH, corresponding to symbols on which the resource configured for the UCI is located. As shown in FIG. 3b, the UCI may be mapped to a symbol, of the PUSCH, overlapping the symbols of the resource configured for the UCI. In this case, one or more longer PUSCH symbols may overlap the symbols of the resource configured for the UCI. If there is only one overlapping symbol, the symbol is selected, and the UCI is mapped to the symbol. If there are a plurality of overlapping symbols, for example, in FIG. 3b, two symbols occupied by the resource configured for the UCI respectively correspond to half of the twelfth symbol and half of the thirteenth symbol in a slot occupied by the PUSCH, the UCI may be mapped to both the two symbols, or the former symbol may be selected. In this way, the transmission latency of the UCI is lower. Certainly, the base station may alternatively determine a symbol in overlapping symbols that is used to carry the UCI, and then notify the terminal of a determined result, and the terminal maps the UCI to the symbol determined by the base station.

In this embodiment, when the mapping-affecting factor includes the subcarrier spacing of the source configured for the UCI and the subcarrier spacing of the PUSCH, the UCI is mapped to the time domain resource, of the PUSCH, corresponding to the time domain resource that can cover the UCI, to ensure that the UCI can be properly mapped to the PUSCH, thereby ensuring normal transmission of the UCI.

Optionally, if the mapping-affecting factor includes the time domain position of the resource configured for the UCI and the time domain position of the PUSCH, the UCI is mapped to an overlapping time domain resource between the PUSCH and the resource configured for the UCI.

Specifically, when there is an overlapping time domain resource between the PUSCH and the resource configured for the UCI, the UCI is mapped to the overlapping time domain resource between the PUSCH and the resource configured for the UCI. The resource configured for the UCI may completely or partially overlap the PUSCH.

Figure 4A:
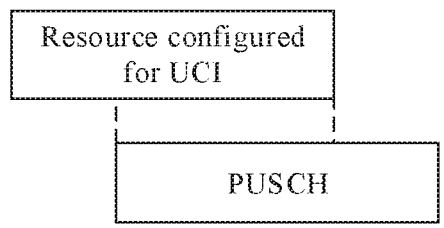
FIG. 4a is a schematic diagram of a resource configured for UCI and a PUSCH.

For example, FIG. 4a is a schematic diagram of a resource configured for UCI and a PUSCH. As shown in FIG. 4a, the resource configured for the UCI partially overlaps the PUSCH, and the resource configured for the UCI is earlier than the PUSCH. In this case, the UCI may be mapped to an overlapping symbol between the PUSCH and the resource configured for the UCI. In a possible implementation, the UCI may be mapped to an earliest symbol in the PUSCH. In this way, a transmission latency of the UCI can be reduced as much as possible.

Figure 4B:
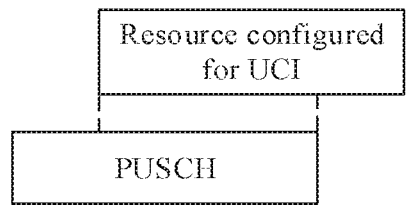
FIG. 4b is another schematic diagram of a resource configured for UCI and a PUSCH.

FIG. 4b is another schematic diagram of a resource configured for UCI and a PUSCH. As shown in FIG. 4b, the resource configured for the UCI partially overlaps the PUSCH, and the resource configured for the UCI is later than the PUSCH. In this case, the UCI may be mapped to an overlapping symbol between the PUSCH and the resource configured for the UCI. In a possible implementation, the UCI may be mapped to a latest symbol in the PUSCH. In this way, it is ensured that the UCI can be mapped to the PUSCH.

In a possible implementation, the UCI is mapped to the first overlapping symbol between the PUSCH and the resource configured for the UCI or the uplink control information is mapped to a symbol configured by the base station.

Specifically, when there is an overlapping time domain resource between the PUSCH and the resource configured for the UCI, the UCI may be mapped to the first overlapping symbol. In this way, the transmission latency of the UCI is lower. In addition, the base station may alternatively determine a symbol in overlapping symbols that is used to carry the UCI, and then notify the terminal of a determined result, and the terminal maps the UCI to the symbol determined by the base station.

In a possible implementation, a symbol corresponding to a position, in the PUSCH, to which the UCI is mapped is not earlier than a start symbol of the resource configured for the UCI, or is not later than the last symbol of the resource configured for the UCI.

Specifically, the time domain position of the resource configured for the UCI includes the start symbol, an end symbol, and a quantity of symbols of the resource, and the time domain position of the PUSCH includes a start symbol, an end symbol, and a quantity of symbols of the PUSCH.

When the UCI is mapped to the PUSCH, there may be the following several cases: (1) It is ensured that the symbol corresponding to the position, in the PUSCH, to which the UCI is mapped is not earlier than the start symbol of the resource configured for the UCI. (2) It is ensured that the symbol corresponding to the position, in the PUSCH, to which the UCI is mapped cannot be later than the last symbol of the resource configured for the UCI. (3) It is ensured that the symbol corresponding to the position, in the PUSCH, to which the UCI is mapped is not earlier than the start symbol of the resource configured for the UCI and is not later than the last symbol of the resource configured for the UCI.

Optionally, if the mapping-affecting factor includes the frequency domain position of the resource configured for the UCI and the frequency domain position of the PUSCH, the UCI is mapped to an overlapping frequency domain resource between the PUSCH and the resource configured for the UCI.

Specifically, both the frequency domain position of the resource configured for the UCI and the frequency domain position of the PUSCH include a start resource block (RB), an end RB, and a quantity of RBs. The terminal may determine, based on the start RB, the end RB, and the quantity of RBs of the resource configured for the UCI, and the start RB, the end RB, and the quantity of RBs of the PUSCH, the overlapping frequency domain resource between the PUSCH and the resource configured for the UCI, and map the UCI to the overlapping frequency domain resource. The UCI may be mapped to all the overlapping frequency domain resource, or may be mapped to a part of the overlapping frequency domain resource. For example, if the resource configured for the UCI occupies a relatively small quantity of RBs, all the UCI may be mapped to a few symbols of the PUSCH in a localized manner, for example, mapped to one symbol in a localized manner.

In addition, a frequency domain part of the resource configured for the UCI may completely or partially overlap that of the PUSCH.

In this embodiment, when the mapping-affecting factor includes the frequency domain position of the source configured for the UCI and the frequency domain position of the PUSCH, the UCI is mapped to the overlapping frequency domain resource between the PUSCH and the resource configured for the UCI, to ensure that the UCI can be properly mapped to the PUSCH, thereby ensuring normal transmission of the UCI.

Optionally, if the mapping-affecting factor includes the transmission latency of the UCI, a time domain position to which the UCI is mapped satisfies the transmission latency of the UCI.

Specifically, the UCI includes the plurality of pieces of information such as the CSI, the A/N, and the SR. Although all the information is multiplexed in a same resource, the information has respective transmission latencies, in other words, has respective timings. For example, a feedback timing of the A/N depends on a value of a feedback time K1 configured by the base station for the terminal, and the transmission latency of the CSI and the transmission latency of the SR are both determined by the base station and then notified to the terminal.

When the terminal maps the UCI, the time domain position, in the PUSCH, to which the UCI is mapped is not later than the transmission latency of the UCI. In an actual application, the time domain position, in the PUSCH, to which the UCI is mapped is not later than a smallest value of the transmission latencies respectively corresponding to the CSI, the A/N, and the SR. In this way, a sending latency of the mapped UCI can be ensured.

In this embodiment, when the mapping-affecting factor includes the transmission latency of the UCI, the time domain position to which the UCI is mapped satisfies the transmission latency of the UCI. In this way, the sending latency of the UCI can be ensured.

Optionally, if the mapping-affecting factor includes the processing latency of the terminal, a time domain position to which the UCI is mapped is greater than the processing latency of the terminal.

Specifically, to ensure that the terminal has enough time to prepare the UCI, when the UCI is mapped, the time domain position to which the UCI is mapped needs to be greater than the processing latency of the terminal. To be specific, a position, in the PUSCH, to which the UCI is mapped is not earlier than the processing latency (a time from a time when a PDSCH is received to a time when an A/N is fed back) of the terminal, to ensure that the position to which the UCI is mapped falls within a range of the processing latency of the terminal.

In this embodiment, when the mapping-affecting factor includes the processing latency of the terminal, the time domain position to which the UCI is mapped is greater than the processing latency of the terminal. In this way, the UE can have enough time to process the UCI, thereby ensuring normal sending of the UCI.

Optionally, if the mapping-affecting factor includes the code block group (CBG) information of the PUSCH, the UCI is mapped to a CBG, in the PUSCH, that is located within a time domain resource range configured for the UCI.

Specifically, when the mapping-affecting factor includes the information about the CBG of the PUSCH, the UCI is mapped to the CBG, in the PUSCH, that is located within the time domain resource range configured for the UCI. In a possible implementation, the UCI may be mapped to all CBGs that are located within the time domain resource range configured for the UCI. In another possible implementation, the UCI may alternatively be mapped to one CBG or some CBGs in the PUSCH in a localized manner, so that a quantity of CBGs that need to be retransmitted can be reduced. For example, the UCI may be mapped to a CBG 3 in FIG. 3a and FIG. 3b, may be mapped to a CBG 4, or may be mapped to both the CBG 3 and the CBG 4.

In this embodiment, when the mapping-affecting factor includes the information about the code block group (CBG) of the PUSCH, the UCI is mapped to the CBG, in the PUSCH, that is located within the time domain resource range configured for the UCI, so that the quantity of CBGs that need to be retransmitted can be reduced.

In another possible implementation, a TB of the PUSCH is not split into CBGs, in other words, the PUSCH includes only one CBG. A mapping resource in the PUSCH for the UCI or a mapping manner of the UCI may be determined depending on whether the PUSCH is transmitted at a TB level or a CBG level. For example, if the PUSCH is transmitted at the TB level, rate matching is performed on data around the UCI. If the PUSCH is transmitted at the CBG level, data is punctured with the UCI. The reason is as follows: If the PUSCH is transmitted at the CBG level, puncturing data with the UCI affects only some CBGs, and a little content needs to be retransmitted if an error occurs; if the PUSCH is transmitted at the TB level, puncturing data with the UCI may cause retransmission of the entire TB.

Optionally, if the mapping-affecting factor includes the frequency hopping status of the PUSCH, the UCI is mapped to each hop in the PUSCH in a distributed manner, or the UCI is mapped to one hop in the PUSCH in a localized manner.

Specifically, if the data in the PUSCH has frequency-domain hops, the UCI may be mapped to each hop in the PUSCH in a distributed manner, so that a frequency diversity gain can be obtained. In addition, the UCI may alternatively be mapped to a few hops in the PUSCH in a localized manner, for example, may be mapped to one hop in a localized manner, to reduce complexity of UCI demodulation.

Optionally, if the mapping-affecting factor includes whether the PUSCH and the resource configured for the UCI are located on a same carrier or a same BWP; and if the PUSCH and the resource configured for the UCI are located on a same carrier or a same BWP, the UCI is mapped to the PUSCH in a frequency domain first manner; or if the PUSCH and the resource configured for the UCI are not located on a same carrier or a same BWP, the UCI is mapped to the PUSCH in a time domain first manner.

Specifically, if the PUSCH and the resource configured for the UCI are located on a same carrier or a same BWP, there is a relatively high possibility that the PUSCH and the resource configured for the UCI have a same subcarrier spacing (SCS). In this case, the UCI may be mapped to the PUSCH in the frequency domain first manner. If the PUSCH and the resource configured for the UCI are not located on a same carrier or a same BWP, there is a relatively high possibility that the PUSCH and the resource configured for the UCI have different SCSs. In this case, the UCI may be mapped to the PUSCH in the time domain first manner.

Optionally, if the PUSCH includes the reference signal, the UCI is mapped to a position, in the PUSCH, that does not overlap with the reference signal; or when a quantity of bits of the uplink control information is less than a preset threshold, the UCI is mapped to the reference signal in the PUSCH, where the reference signal includes at least one of the following signals: a demodulation reference signal (DMRS), a sounding reference signal (SRS), a channel state information-reference signal (CSI-RS), or a phase tracking reference signal (PT-RS).

Specifically, when the UCI is mapped, if the PUSCH includes at least one of the DMRS, the SRS, the CSI-RS, or the PT-RS, a position of the DMRS, the SRS, the CSI-RS, or the PT-RS may be avoided, to be specific, the UCI is mapped to the position, in the PUSCH, that does not overlap with the reference signal. In addition, if the quantity of bits of the UCI is relatively small, for example, less than 2, the UCI may be directly mapped to the reference signal in the PUSCH. For example, a cyclic shift (CS), an orthogonal cover code (OCC), or a comb carries a bit.

In addition, it should be noted that if the mapping-affecting factor includes two or more of the foregoing factors, when the UCI is mapped, mapping conditions corresponding to all the included mapping-affecting factors need to be satisfied. For example, if the mapping-affecting factor includes the time domain position of the resource configured for the UCI and the position of the reference signal of the PUSCH, when the UCI is mapped to the overlapping time domain resource between the PUSCH and the resource configured for the UCI, if the DMRS, the SRS, the CSI-RS, or the PT-RS exists, the position of the reference signal needs to be avoided, for example, an appropriate symbol before or after the position needs to be selected to map the UCI.

It should be noted that in an actual application, when the mapping-affecting factor includes all the foregoing information, after the UCI is mapped to the PUSCH, performance of the UCI is the best.

Optionally, the UCI includes at least two parts, and the at least two parts are mapped to the PUSCH in different mapping manners, or the at least two parts are mapped to different time-frequency resources.

Specifically, the UCI may be divided into a plurality of parts. When each part is mapped to the PUSCH, a corresponding mapping manner and a time-frequency resource to which the part is mapped may be independently selected. For example, the UCI includes a first part and a second part. The first part may be mapped in a first mapping manner, and the second part may be mapped in a second mapping manner. In this case, the first part and the second part may be mapped to a same time-frequency resource, or may be mapped to different time-frequency resources. In addition, alternatively, the first part may be mapped to a first time-frequency resource, and the second part may be mapped to a second time-frequency resource. In this case, the first part and the second part may be mapped in a same mapping manner, or may be mapped in different mapping manners.

In addition, in a possible implementation, types of information included in the parts of the UCI are different. Specifically, the UCI includes the information such as the CSI, the A/N, and the SR. If the UCI includes at least two parts of information, types of the information included in the parts are different. For example, the UCI is divided into two parts of information, where a first part of information includes the A/N, and a second part of information includes the CSI and the SR. For another example, the UCI is divided into three parts of information, where a first part of information includes the A/N, a second part of information includes the CSI, and a third part of information includes the SR.

In a possible implementation, types of information included in the parts of the UCI are the same, for example, are all CSIs, but information included in the parts is different. For example, the UCI is divided into two parts of information, where a first part of information includes the CQI/PMI, and a second part of information includes the RI. For another example, the UCI is divided into two parts of information, where a first part of information includes a Type I CSI, and a second part of information includes a Type II CSI. The Type 1 CSI is similar to a quantized CQI/PMI in LTE, and the Type II CSI is channel matrix information.

Optionally, a mapping manner of mapping the UCI to the PUSCH includes localized mapping or distributed mapping; or a mapping manner of the UCI includes puncturing data with the UCI or performing rate matching on data around the UCI.

Specifically, when the UCI is mapped to the PUSCH, the manner of localized mapping or the manner of distributed mapping may be performed by puncturing data with the UCI or by performing rate matching on data around the UCI.

For example, when the UCI is mapped, if the mapping-affecting factor includes the modulation order of the PUSCH, the UCI is mapped to the PUSCH in the manner of localized mapping when the modulation order is greater than a preset modulation order; or the UCI is mapped to the PUSCH in the manner of distributed mapping when the modulation order is not greater than the preset modulation order. In this case, regardless of a value of the modulation order, the terminal may map the UCI by puncturing data with the UCI or by performing rate matching on data around the UCI.

If the mapping-affecting factor includes the code rate of the PUSCH, the UCI is mapped to the PUSCH in the manner of localized mapping when the code rate is greater than a preset code rate; or the UCI is mapped to the PUSCH in the manner of distributed mapping when the code rate is not greater than the preset code rate. In this case, regardless of a value of the code rate, the terminal may map the UCI by puncturing data with the UCI or by performing rate matching on data around the UCI.

If the mapping-affecting factor includes the retransmission information of the data in the PUSCH, when the data in the PUSCH is initially transmitted, the UCI is mapped to the PUSCH by performing rate matching on data around the UCI; or when the data in the PUSCH is retransmitted, the UCI is mapped to the PUSCH by puncturing data with the UCI. In this case, regardless of whether the data is retransmitted, the terminal may map the UCI to the PUSCH in a localized manner, or may map the UCI to the PUSCH in a distributed manner.

If the mapping-affecting factor includes the size of the data packet in the PUSCH, when the size of the data packet is greater than a preset value, in other words, the data packet is a large data packet, the UCI is mapped to the PUSCH by puncturing data with the UCI; or when the size of the data packet is not greater than the preset value, in other words, the data packet is a small data packet, the UCI is mapped to the PUSCH by performing rate matching on data around the UCI. In this case, regardless of the size of the data packet, the terminal may map the UCI to the PUSCH in a localized manner, or may map the UCI to the PUSCH in a distributed manner.

In addition, the terminal may perform rate matching in advance if a time at which the terminal learns of a quantity of bits that need to be fed back is earlier than a time of actually feeding back an A/N.

Step 203. The terminal sends the PUSCH to the base station.

In this embodiment, after mapping the UCI to the PUSCH, the terminal sends, to the base station, the PUSCH to which the UCI is mapped.

Step 204. The base station obtains, based on the mapping-affecting factor, the UCI included in the PUSCH.

In this embodiment, after receiving the PUSCH sent by the terminal, the base station obtains the mapping-affecting factor, and obtains, based on the obtained mapping-affecting factor, the UCI included in the PUSCH.

In a possible implementation, the mapping-affecting factor is configured by the base station for the terminal or is reported by the terminal to the base station. The subcarrier spacing of the resource configured for the UCI, the subcarrier spacing of the PUSCH, the time domain position of the resource configured for the UCI, the time domain position of the PUSCH, the frequency domain position of the resource configured for the UCI, the frequency domain position of the PUSCH, the transmission latency of the UCI, the information about the CBG of the PUSCH, the frequency hopping status of the PUSCH, the modulation order of the PUSCH, the code rate of the PUSCH, the retransmission information of the data in the PUSCH, the size of the data packet in the PUSCH, whether the PUSCH and the resource configured for the UCI are located on a same carrier or a same bandwidth part, the position of the reference signal of the PUSCH, or the timing of the UCI is configured by the base station for the terminal, and the processing latency of the terminal is reported by the terminal to the base station.

According to the uplink control information mapping method provided in this embodiment of this application, the mapping-affecting factor is determined, the uplink control information is mapped to the PUSCH based on the mapping-affecting factor, and then the PUSCH is sent to the base station. The mapping-affecting factor is used to indicate the PUSCH or the uplink control information. After determining the mapping-affecting factor, the terminal device maps the uplink control information to the PUSCH in different manners based on different mapping-affecting factors. Therefore, the terminal can properly map the uplink control information (UCI) to the PUSCH, and can properly send the UCI through the PUSCH.

Figure 5:
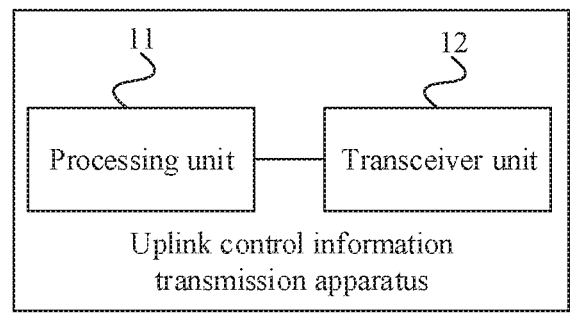
FIG. 5 is a schematic structural diagram of an uplink control information transmission apparatus according to an embodiment of this application.

FIG. 5 is a schematic structural diagram of an uplink control information transmission apparatus according to an embodiment of this application. Referring to FIG. 5, the apparatus includes a processing unit 11 and a transceiver unit 12.

The processing unit 11 is configured to determine a mapping-affecting factor, where the mapping-affecting factor is used to indicate a physical uplink shared channel (PUSCH) or uplink control information.

The processing unit is further configured to map the uplink control information to the PUSCH based on the mapping-affecting factor.

The transceiver unit 12 is configured to send the PUSCH to a base station.

The uplink control information transmission apparatus provided in this embodiment of this application can perform the foregoing corresponding method embodiment. Implementation principles and technical effects thereof are similar, and details are not described herein again.

Optionally, the mapping-affecting factor includes at least one of the following information: a subcarrier spacing of a resource configured for the uplink control information, a subcarrier spacing of the PUSCH, a time domain position of the resource configured for the uplink control information, a time domain position of the PUSCH, a frequency domain position of the resource configured for the uplink control information, a frequency domain position of the PUSCH, a transmission latency of the uplink control information, a processing latency of a terminal, information about a code block group (CBG) of the PUSCH, a frequency hopping status of the PUSCH, a modulation order of the PUSCH, a code rate of the PUSCH, retransmission information of data in the PUSCH, a size of a data packet in the PUSCH, whether the PUSCH and the resource configured for the uplink control information are located on a same carrier or a same bandwidth part, a position of a reference signal of the PUSCH, or a timing of the uplink control information.

Optionally, the mapping-affecting factor includes the subcarrier spacing of the resource configured for the uplink control information and the subcarrier spacing of the PUSCH, and the uplink control information is mapped to a time domain resource, of the PUSCH, corresponding to a time domain resource that can cover the uplink control information.

Optionally, the mapping-affecting factor includes the time domain position of the resource configured for the uplink control information and the time domain position of the PUSCH, and the uplink control information is mapped to an overlapping time domain resource between the PUSCH and the resource configured for the uplink control information.

Optionally, the uplink control information is mapped to the first overlapping symbol between the PUSCH and the resource configured for the uplink control information or the uplink control information is mapped to a symbol configured by the base station.

Optionally, a symbol corresponding to a position, in the PUSCH, to which the uplink control information is mapped is not earlier than a start symbol of the resource configured for the uplink control information, or is not later than the last symbol of the resource configured for the uplink control information.

Optionally, the mapping-affecting factor includes the frequency domain position of the resource configured for the uplink control information and the frequency domain position of the PUSCH, and the uplink control information is mapped to an overlapping frequency domain resource between the PUSCH and the resource configured for the uplink control information.

Optionally, the mapping-affecting factor includes the transmission latency of the uplink control information, and a time domain position to which the uplink control information is mapped satisfies the transmission latency of the uplink control information.

Optionally, the mapping-affecting factor includes the processing latency of the terminal, and a time domain position to which the uplink control information is mapped is greater than the processing latency of the terminal.

Optionally, the mapping-affecting factor includes the information about the code block group (CBG) of the PUSCH, and the uplink control information is mapped to a CBG, in the PUSCH, that is located within a time domain resource range configured for the uplink control information.

Optionally, the mapping-affecting factor includes the frequency hopping status of the PUSCH, and the uplink control information is mapped to each hop in the PUSCH in a distributed manner, or the uplink control information is mapped to one hop in the PUSCH in a localized manner.

Optionally, the mapping-affecting factor includes whether the PUSCH and the resource configured for the uplink control information are located on a same carrier or a same bandwidth part; and if the PUSCH and the resource configured for the uplink control information are located on a same carrier or a same bandwidth part, the uplink control information is mapped to the PUSCH in a frequency domain first manner; or if the PUSCH and the resource configured for the uplink control information are not located on a same carrier or a same bandwidth part, the uplink control information is mapped to the PUSCH in a time domain first manner.

Optionally, if the PUSCH includes the reference signal, the uplink control information is mapped to a position, in the PUSCH, that does not overlap with the reference signal; or when a quantity of bits of the uplink control information is less than a preset threshold, the uplink control information is mapped to the reference signal in the PUSCH, where the reference signal includes at least one of the following signals: a demodulation reference signal DMRS, a sounding reference signal SRS, a channel state information-reference signal CSI-RS, or a phase tracking reference signal PT-RS.

Optionally, the uplink control information includes at least two parts, and the at least two parts are mapped to the PUSCH in different mapping manners, or the at least two parts are mapped to different time-frequency resources.

Optionally, types of information included in the parts are different.

Optionally, a mapping manner of the uplink control information is localized mapping or distributed mapping; or a mapping manner of the uplink control information is puncturing data with the uplink control information or performing rate matching on data around the uplink control information.

Optionally, the mapping-affecting factor is configured by the base station for the terminal or is reported by the terminal to the base station.

The uplink control information transmission apparatus provided in this embodiment of this application can perform the foregoing corresponding method embodiment. Implementation principles and technical effects thereof are similar, and details are not described herein again.

It should be noted that, the division of the apparatus into units is merely logical function division; in an actual implementation, all or some of the units may be integrated into one physical entity, or the units may be physically separate. In addition, all of the units may be implemented in a form of software invoked by a processing element or in a form of hardware. Alternatively, some of the units may be implemented in a form of software invoked by a processing element, and some of the units may be implemented in a form of hardware. For example, a sending unit may be a processing element disposed separately, or may be integrated into a chip of the apparatus for implementation. In addition, the sending unit may be stored in a memory of the apparatus in a form of a program, and invoked by a processing element of the apparatus to perform a function of the sending unit. Implementation of another unit is similar thereto. In addition, these units may be all or partially integrated, or may be implemented independently. The processing element herein may be an integrated circuit and has a signal processing capability. In an implementation process, steps in the foregoing method or the foregoing units may be implemented by using an integrated logical circuit of hardware in the processing element, or by using an instruction in a form of software. In addition, the sending unit is a sending control unit, and may send information by using a sending apparatus, such as an antenna and a radio frequency apparatus, of the apparatus.

The foregoing units may be configured as one or more integrated circuits for implementing the foregoing method, for example, one or more application-specific integrated circuits (ASIC), one or more microprocessors (for example, digital signal processor (DSP)), or one or more field programmable gate arrays (FPGA). For another example, when one of the foregoing units is implemented by a processing element by invoking a program, the processing element may be a general purpose processor, for example, a central processing unit (CPU) or another processor that can invoke the program. For another example, these units may be integrated together, and implemented in a form of a system-on-a-chip (SOC).

Figure 6:
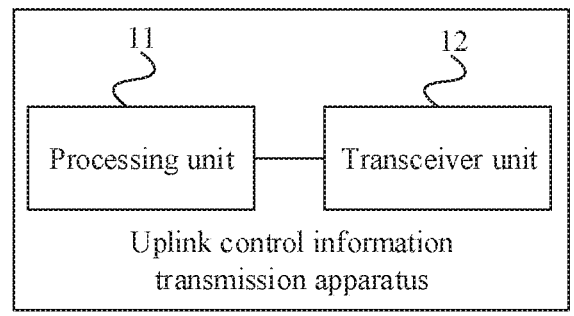
FIG. 6 is another schematic structural diagram of an uplink control information transmission apparatus according to an embodiment of this application.

FIG. 6 is another schematic structural diagram of an uplink control information transmission apparatus according to an embodiment of this application. Referring to FIG. 6, the apparatus includes a transceiver unit 21 and a processing unit 22.

The transceiver unit 21 is configured to receive a physical uplink shared channel (PUSCH) sent by a terminal, where the PUSCH includes uplink control information.

The processing unit 22 is configured to obtain, based on a mapping-affecting factor, the uplink control information included in the PUSCH, where the mapping-affecting factor is used to indicate the physical uplink shared channel (PUSCH) or the uplink control information.

The uplink control information transmission apparatus provided in this embodiment of this application can perform the foregoing corresponding method embodiment. Implementation principles and technical effects thereof are similar, and details are not described herein again.

Optionally, the mapping-affecting factor includes at least one of the following information: a subcarrier spacing of a resource configured for the uplink control information, a subcarrier spacing of the PUSCH, a time domain position of the resource configured for the uplink control information, a time domain position of the PUSCH, a frequency domain position of the resource configured for the uplink control information, a frequency domain position of the PUSCH, a transmission latency of the uplink control information, a processing latency of the terminal, information about a code block group (CBG) of the PUSCH, a frequency hopping status of the PUSCH, a modulation order of the PUSCH, a code rate of the PUSCH, retransmission information of data in the PUSCH, a size of a data packet in the PUSCH, whether the PUSCH and the resource configured for the uplink control information are located on a same carrier or a same bandwidth part, a position of a reference signal of the PUSCH, and a timing of the uplink control information.

Optionally, the mapping-affecting factor is configured by a base station for the terminal or is reported by the terminal to the base station.

The uplink control information transmission apparatus provided in this embodiment of this application can perform the foregoing corresponding method embodiment. Implementation principles and technical effects thereof are similar, and details are not described herein again.

It should be noted that, the division of the apparatus into units is merely logical function division; in an actual implementation, all or some of the units may be integrated into one physical entity, or the units may be physically separate. In addition, all of the units may be implemented in a form of software invoked by a processing element or in a form of hardware. Alternatively, some of the units may be implemented in a form of software invoked by a processing element, and some of the units may be implemented in a form of hardware. For example, the transceiver unit may be a processing element disposed separately, or may be integrated into a chip of the apparatus for implementation. In addition, the receiving unit may be stored in a memory of the apparatus in a form of a program, and invoked by a processing element of the apparatus to perform a function of the receiving unit. Implementation of another unit is similar thereto. In addition, these units may be all or partially integrated, or may be implemented independently. The processing element herein may be an integrated circuit and has a signal processing capability. In an implementation process, steps in the foregoing method or the foregoing units may be implemented by using an integrated logical circuit of hardware in the processing element, or by using an instruction in a form of software. In addition, the receiving unit is a receiving control unit, and may receive information by using a receiving apparatus, such as an antenna and a radio frequency apparatus, of the apparatus.

The foregoing units may be configured as one or more integrated circuits for implementing the foregoing method, for example, one or more application-specific integrated circuits (ASIC), one or more microprocessors (DSP), or one or more field programmable gate arrays (FPGA). For another example, when one of the foregoing units is implemented by a processing element by invoking a program, the processing element may be a general purpose processor, for example, a central processing unit (CPU) or another processor that can invoke the program. For another example, these units may be integrated together, and implemented in a form of a system-on-a-chip (SOC).

Figure 7:
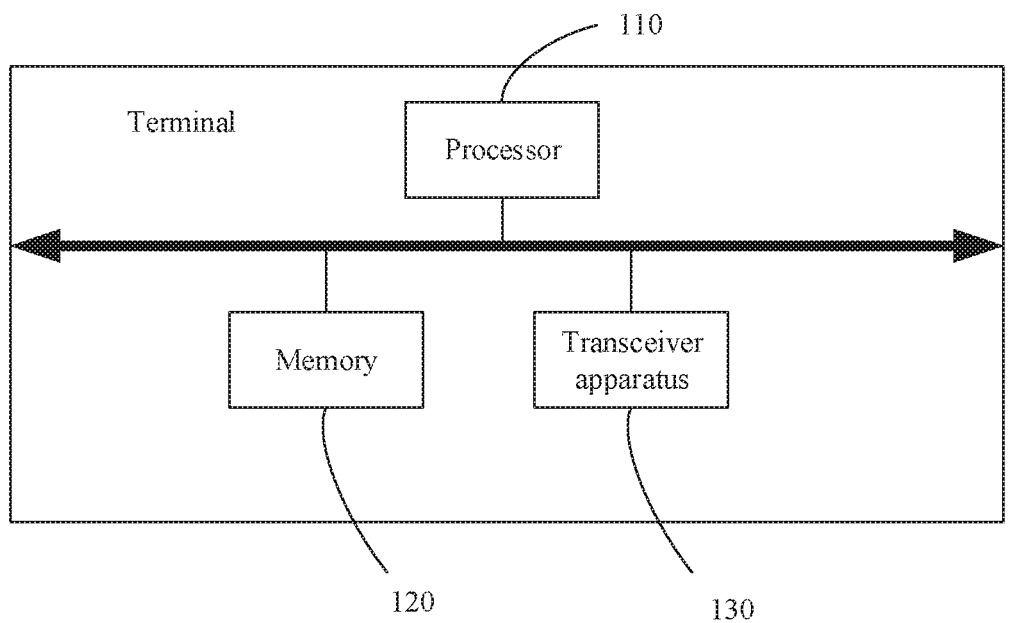
FIG. 7 is a schematic structural diagram of a terminal according to an embodiment of this application.

FIG. 7 is a schematic structural diagram of a terminal according to an embodiment of this application. As shown in FIG. 7, the terminal includes a processor 110, a memory 120, and a transceiver apparatus 130. The transceiver apparatus 130 may be connected to an antenna. In a downlink direction, the transceiver apparatus 130 receives, by using the antenna, information sent by a base station, and sends the information to the processor 110 for processing. In an uplink direction, the processor 110 processes data of the terminal, and sends the data to the base station by using the transceiver apparatus 130.

The memory 120 is configured to store a program for implementing the foregoing method embodiment or the modules in the embodiment shown in FIG. 5, and the processor 110 invokes the program to perform operations in the foregoing method embodiment, to implement the modules shown in FIG. 5.

Alternatively, some or all of the foregoing modules may be embedded in a chip of the terminal in a form of an integrated circuit for implementation. In addition, the modules may be independently implemented, or may be integrated together. To be specific, the foregoing units may be configured as one or more integrated circuits for implementing the foregoing method, for example, one or more application-specific integrated circuits (ASIC), one or more microprocessors (DSP), or one or more field programmable gate arrays (FPGA).

Figure 8:
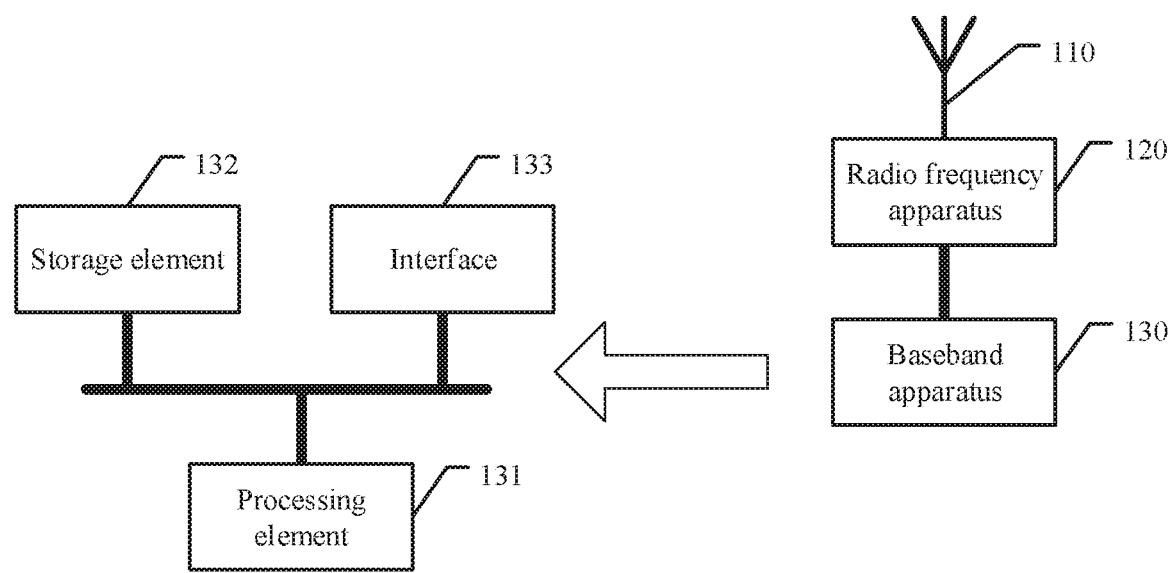
FIG. 8 is a schematic structural diagram of a base station according to an embodiment of this application.

FIG. 8 is a schematic structural diagram of a base station according to an embodiment of this application. As shown in FIG. 8, the base station includes an antenna 110, a radio frequency apparatus 120, and a baseband apparatus 130. The antenna 110 is connected to the radio frequency apparatus 120. In an uplink direction, the radio frequency apparatus 120 receives, by using the antenna 110, information sent by a terminal, and sends the information sent by the terminal, to the baseband apparatus 130 for processing. In a downlink direction, the baseband apparatus 130 processes information of the terminal and sends the information to the radio frequency apparatus 120, and the radio frequency apparatus 120 processes the information of the terminal and then sends the information to the terminal by using the antenna 110.

In an implementation, the foregoing modules are implemented by a processing element by invoking a program. For example, the baseband apparatus 130 includes a processing element 131 and a storage element 132, and the processing element 131 invokes a program stored in the storage element 132, to perform the method in the foregoing method embodiment. In addition, the baseband apparatus 130 may further include an interface 133, configured to exchange information with the radio frequency apparatus 120. For example, the interface is a common public radio interface (CPRI).

In another implementation, the foregoing modules may be configured as one or more processing elements for implementing the foregoing method, and the processing elements are disposed on the baseband apparatus 130. The processing element herein may be an integrated circuit, for example, one or more ASICs, one or more DSPs, or one or more FPGAs. These integrated circuits may be integrated together to form a chip.

For example, the foregoing modules may be integrated together, and implemented in a form of a system-on-a-chip (SOC). For example, the baseband apparatus 130 includes a SOC chip, configured to implement the foregoing method. A processing element 131 and a storage element 132 may be integrated in the chip, and the foregoing method or the functions of the foregoing units may be implemented by the processing element 131 by invoking a program stored in the storage element 132. Alternatively, at least one integrated circuit may be integrated in the chip to implement the foregoing method or the functions of the foregoing units. Alternatively, the foregoing implementations may be combined, so that functions of some units are implemented by the processing element by invoking a program, and functions of some units are implemented by using an integrated circuit.

Regardless of which manner is used, the base station includes at least one processing element, a storage element, and a communications interface, and the at least one processing element is configured to perform the method provided in the foregoing method embodiment. The processing element may perform some or all of the steps in the foregoing method embodiment in the first manner, to be specific, by executing the program stored in the storage element; or in the second manner, to be specific, by using an integrated logic circuit of hardware in the processor element in combination with an instruction. Certainly, the method provided in the foregoing method embodiment may alternatively be performed by combining the first manner with the second manner.

The processing element herein is the same as that described above, and may be a general purpose processor such as a central processing unit (CPU); or may be configured as one or more integrated circuits for implementing the foregoing method, for example, one or more application-specific integrated circuits (ASIC), one or more microprocessors (DSP), or one or more field programmable gate arrays (FPGA).

The storage element may be a memory, or may be a general name of a plurality of storage elements.

This application further provides a storage medium, including a readable storage medium and a computer program, and the computer program is used to implement the uplink control information communication method provided in any one of the foregoing embodiments.

This application further provides a program product, where the program product includes a computer program (namely, an executable instruction), and the computer program is stored in a readable storage medium. At least one processor of a terminal may read the computer program from the readable storage medium, and the at least one processor executes the computer program, so that the terminal performs the uplink control information communication method provided in the foregoing implementations.

An embodiment of this application further provides an uplink control information transmission apparatus, including at least one storage element and at least one processing element. The at least one storage element is configured to store a program; when the program is executed, the uplink control information transmission apparatus is enabled to perform an operation of the terminal in any one of the foregoing embodiments. The apparatus may be a terminal chip.

This application further provides a storage medium, including a readable storage medium and a computer program, and the computer program is used to implement the uplink control information communication method provided in any one of the foregoing embodiments.

This application further provides a program product, where the program product includes a computer program (namely, an executable instruction), and the computer program is stored in a readable storage medium. At least one processor of a base station may read the computer program from the readable storage medium, and the at least one processor executes the computer program, so that the base station performs the uplink control information communication method provided in the foregoing implementations.

An embodiment of this application further provides an uplink control information transmission apparatus, including at least one storage element and at least one processing element. The at least one storage element is configured to store a program; when the program is executed, the uplink control information transmission apparatus is enabled to perform an operation of a base station in any one of the foregoing embodiments. The apparatus may be a base station chip.

All or some of the steps of the foregoing method embodiments may be implemented by a program by instructing relevant hardware. The program may be stored in a readable memory. When the program is executed, the steps in the foregoing method embodiments are performed. The memory (storage medium) includes: a read-only memory (ROM), a RAM, a flash memory, a hard disk, a solid-state drive, a magnetic tape, a floppy disk, an optical disc, and any combination thereof.

What is claimed is:

1. A method, comprising:
 determining, by a terminal, a mapping-affecting factor, wherein the mapping-affecting factor comprises a processing latency of the terminal and a modulation order of a physical uplink shared channel (PUSCH);
 mapping, by the terminal, uplink control information to the PUSCH based on the mapping-affecting factor, wherein a time duration from a time when a physical downlink shared channel (PDSCH) is received to a time domain position of the PUSCH is greater than the processing latency of the terminal, or a time duration from a time when a PDSCH is received to a start symbol of the PUSCH is greater than the processing latency of the terminal, and wherein the uplink control information is mapped to the PUSCH in a manner of localized mapping when the modulation order is greater than a preset modulation order, or the uplink control information is mapped to the PUSCH in a manner of distributed mapping when the modulation order is not greater than the preset modulation order; and
 sending, by the terminal, the PUSCH to a base station.

2. The method according to claim 1, wherein the uplink control information comprises at least one of an acknowledgement (ACK) or negative acknowledgement (NACK), the method further comprising:
 reporting the processing latency of the terminal to the base station.

3. The method according to claim 1, wherein the uplink control information comprises at least one of an ACK or NACK,
 the method further comprising:
 receiving a transmission latency of the uplink control information from the base station, wherein the transmission latency of the uplink control information is a feedback timing of the at least one of ACK or NACK.

4. The method according to claim 1, wherein the PUSCH and a physical uplink control channel (PUCCH) configured to transmit the uplink control information overlap in a time domain, and wherein the PUCCH is earlier than the PUSCH,
 the uplink control information is mapped to an overlapping symbol between the PUSCH and the PUCCH.

5. The method according to claim 1, wherein a subcarrier spacing of the uplink control information is different from a subcarrier spacing of the PUSCH,
 the uplink control information is mapped to a time domain resource that is of the PUSCH and covers the uplink control information.

6. The method according to claim 1, wherein the mapping-affecting factor further comprises at least one of the following information: a transmission latency of the uplink control information, a subcarrier spacing of the uplink control information, a subcarrier spacing of the PUSCH, a frequency hopping status of the PUSCH, a size of a data packet in the PUSCH, whether the PUSCH and a resource configured for the uplink control information are located on a same carrier or a same bandwidth part, or a position of a reference signal of the PUSCH.

7. An apparatus, comprising:
 one or more memories configured to store instructions; and
 one or more processors coupled to the one or more memories and configured to execute the instructions to cause the apparatus to:
 determine a mapping-affecting factor, wherein the mapping-affecting factor comprises a processing latency of the apparatus and a modulation order of a physical uplink shared channel (PUSCH);
 map uplink control information to the PUSCH based on the mapping-affecting factor, wherein a time duration from a time when a physical downlink shared channel (PDSCH) is received to a time domain position of the PUSCH is greater than the processing latency of the apparatus, or a time duration from a time when a PDSCH is received to a start symbol of the PUSCH is greater than the processing latency of the apparatus, and wherein the uplink control information is mapped to the PUSCH in a manner of localized mapping when the modulation order is greater than a preset modulation order, or the uplink control information is mapped to the PUSCH in a manner of distributed mapping when the modulation order is not greater than the preset modulation order; and
 send the PUSCH to a base station.

8. The apparatus according to claim 7, wherein the uplink control information comprises at least one of an acknowledgement (ACK) or negative acknowledgement (NACK),
 wherein executing the instructions further causes the apparatus to:
 report the processing latency of the apparatus to the base station.

9. The apparatus according to claim 7, wherein the uplink control information comprises at least one of an ACK or NACK,
 wherein executing the instructions further causes the apparatus to:
 receive a transmission latency of the uplink control information from the base station, wherein the transmission latency of the uplink control information is a feedback timing of the at least one of ACK or NACK.

10. The apparatus according to claim 7, wherein the PUSCH and a physical uplink control channel (PUCCH) configured to transmit the uplink control information overlap in a time domain, and wherein the PUCCH is earlier than the PUSCH,
 the uplink control information is mapped to an overlapping symbol between the PUSCH and the PUCCH.

11. The apparatus according to claim 7, wherein a subcarrier spacing of the uplink control information is different from a subcarrier spacing of the PUSCH,
 the uplink control information is mapped to a time domain resource that is of the PUSCH and covers the uplink control information.

12. The apparatus according to claim 7, wherein the mapping-affecting factor further comprises at least one of the following information: a transmission latency of the uplink control information, a subcarrier spacing of the uplink control information, a subcarrier spacing of the PUSCH, a frequency hopping status of the PUSCH, a size of a data packet in the PUSCH, whether the PUSCH and a resource configured for the uplink control information are located on a same carrier or a same bandwidth part, or a position of a reference signal of the PUSCH.

13. A non-transitory computer-readable storage medium, comprising executable instructions, wherein the executable instructions, when executed by a computer system, cause the computer system to:
   determine a mapping-affecting factor, wherein the mapping-affecting factor comprises a processing latency of a terminal and a modulation order of a physical uplink shared channel (PUSCH);
   map uplink control information to the PUSCH based on the mapping-affecting factor, wherein a time duration from a time when a physical downlink shared channel (PDSCH) is received to a time domain position of the PUSCH is greater than the processing latency of the terminal, or a time duration from a time when a PDSCH is received to a start symbol of the PUSCH is greater than the processing latency of the terminal, and wherein the uplink control information is mapped to the PUSCH in a manner of localized mapping when the modulation order is greater than a preset modulation order, or the uplink control information is mapped to the PUSCH in a manner of distributed mapping when the modulation order is not greater than the preset modulation order; and
   send the PUSCH to a base station.

14. The non-transitory computer-readable storage medium according to claim 13, wherein the uplink control information comprises at least one of an acknowledgement (ACK) or negative acknowledgement (NACK),
   wherein the executable instructions further causes the computer system to:
   report the processing latency of the terminal to the base station.

15. The non-transitory computer-readable storage medium according to claim 13, wherein the uplink control information comprises at least one of an ACK or NACK,
   wherein the executable instructions further causes the computer system to:
   receive a transmission latency of the uplink control information from the base station, wherein the transmission latency of the uplink control information is a feedback timing of the at least one of ACK or NACK.

16. The non-transitory computer-readable storage medium according to claim 13, wherein the PUSCH and a physical uplink control channel (PUCCH) configured to transmit the uplink control information overlap in a time domain, and wherein the PUCCH is earlier than the PUSCH, the uplink control information is mapped to an overlapping symbol between the PUSCH and the PUCCH.

17. The non-transitory computer-readable storage medium according to claim 13, wherein the mapping-affecting factor further comprises at least one of the following information: a transmission latency of the uplink control information, a subcarrier spacing of the uplink control information, a subcarrier spacing of the PUSCH, a frequency hopping status of the PUSCH, a size of a data packet in the PUSCH, whether the PUSCH and a resource configured for the uplink control information are located on a same carrier or a same bandwidth part, or a position of a reference signal of the PUSCH.

* * * * *